US007243582B1

(12) United States Patent
Launius

(10) Patent No.: US 7,243,582 B1
(45) Date of Patent: Jul. 17, 2007

(54) MANUAL LATHE

(76) Inventor: William E. Launius, 100 E. Laurel Ave., Millstadt, IL (US) 62260

( * ) Notice: Subject to any disclaimer, the term of this patent is extended or adjusted under 35 U.S.C. 154(b) by 0 days.

(21) Appl. No.: 11/416,347

(22) Filed: May 2, 2006

(51) Int. Cl.
*B23B 3/22* (2006.01)

(52) U.S. Cl. .......................................... 82/104; 82/112

(58) Field of Classification Search .................. 82/104, 82/112, 113; 407/40
See application file for complete search history.

(56) References Cited

U.S. PATENT DOCUMENTS 4,493,231 A * 1/1985 Wossner ...................... 82/112
4,580,934 A * 4/1986 McCormick ................ 408/201
5,279,192 A * 1/1994 Hartman ...................... 82/112
6,363,821 B1 * 4/2002 Greenwald et al. .......... 82/1.11

* cited by examiner

*Primary Examiner*—Willmon Fridie, Jr.
(74) *Attorney, Agent, or Firm*—Charles McCloskey

(57) ABSTRACT

Wheels of model cars rotate upon axles and their rims contact a track. The present invention is a palm size hand powered lathe for rounding and truing a wheel upon a spindle. The lathe has a bracket that admits a blade to contact the outer edge of the wheel. The blade advances into the wheel by the turning of a threaded rod contained within a housing. The housing limits the inward and outward movement of the blade. The threaded rod has a handle upon one end and a rounded head upon the other end that engages a slot in the blade. A clip provides a rigid connection of the threaded rod to the bracket. The housing has a shape comfortable in the hand. And the invention provides a child the ability to remove wheel material within thousandths of an inch.

8 Claims, 7 Drawing Sheets

MANUAL LATHE

CROSS REFERENCE TO RELATED APPLICATION

This application is related to the non-provisional application Ser. No. 10/658,041 filed on Sep. 9, 2003 which is now U.S. Pat. No. 6,969,312 issued Nov. 29, 2005, and the aforesaid application is commonly owned by the same inventor.

BACKGROUND OF THE INVENTION

The present invention relates to a manual lathe for use as a hand tool on model cars. The manual lathe has particular utility in connection with removing tread material to round wheels for model cars.

As winter loosens its grip, Cub Scouts emerge from dens across the land for a contest: the Pinewood Derby®. For the derby, Cub Scouts and their adult sponsors assemble a wooden car from a kit and then race their cars against those of fellow Cub Scouts upon a track with separate guideways for each car. Cub Scouts that win local races advance to tournaments. In a car race, speed remains essential to victory and thousandths of a second count. Cub Scouts and their sponsors seek to minimize wheel friction and to align wheels precisely. The wood cars have four wheels. Each plastic wheel has a finished face, a rim, and a centered hub opposite the finished face. The hub fits over an axle hammered into the car. Spinning upon the axle, the hub contacts the car and the wheel contacts the track.

A unique aspect of the present invention is rounding a wheel with minimal risk of injury and without power tools. In a lathe, a wheel rounds as it is turned against a gouge or blade applied radially upon the rim. A round wheel rotates and rolls flat upon a track in complete contact, minimizes wobble in the wheel, and avoids contacting the guideway.

DESCRIPTION OF THE PRIOR ART

Prior art designs rounded wheels by eye or with power tools such as a wood working lathe or drill chuck. Because of power tool use, Cub Scouts had less involvement in fine-tuning the wheels for their cars and slower cars. In summary, the prior art required large power tools and skill to round wheels usually done by an adult or sponsor while Cub Scouts sat out the fine-tuning of their wheels for speed.

The present art overcomes the limitations of the prior art. The difficulty in rounding wheels by Cub Scouts with minimal injury is shown by the operation of the typical method. From the factory and handling, wheels have slight imperfections upon the rim and outer edge. Installed upon a car, an as delivered a wheel may wobble or crown adversely. The wheel makes partial contact with the track and the guideway, increasing friction and reducing the speed of the car. Typically, sponsors and Cub Scouts true wheels and square rims by sanding burrs and protrusions detected by feel.

While the above-described devices and methods fulfill their respective, particular objectives and requirements, the prior art does not describe a manual lathe for model car wheels. That is, the art of the present invention allows Cub Scouts to round the wheel around the perimeter and to square the rim of the wheel. Manual lathes are desirable to reduce friction between a wheel and a track and for a more precise orientation of a wheel to the track.

Therefore, a need exists for a new and improved manual lathe. And in this regard, the present invention substantially fulfills this need. In this respect, the manual lathe according to the present invention substantially departs from the conventional concepts and designs of the prior art, and in doing so provides a device primarily developed for the purpose of truing and rounding model car wheels.

SUMMARY OF THE INVENTION

In view of the foregoing disadvantages inherent in the known types of manual lathes now present in the prior art, the present invention provides an improved manual lathe, and overcomes the above-mentioned disadvantages and drawbacks of the prior art. As such, the general purpose of the present invention, which will be described subsequently in greater detail, is to provide a new and improved manual lathe which has all the advantages of the prior art mentioned heretofore and many novel features that result in a manual lathe which is not anticipated, rendered obvious, suggested, or even implied by the prior art, either alone or in any combination thereof.

The present invention essentially comprises a palm size hand powered lathe for rounding and truing a wheel. The lathe has a bracket that receives a spindle, such as the hub tool, U.S. Pat. No. 6,969,312, of the Applicant, carrying a wheel upon one end. The bracket also admits a blade that contacts the outer edge of the wheel. The blade advances into the wheel by the turning of a threaded rod contained within a housing. The housing limits the inward and outward movement of the blade.

There has thus been outlined, rather broadly, the more important features of the invention in order that the detailed description thereof that follows may be better understood and in order that the present contribution to the art may be better appreciated.

The invention may also include a handle upon one end of the threaded rod, a rounded head upon the other end of the threaded rod that engages a slot in the blade, a clip providing a rigid connection of the threaded rod to the bracket, a housing of a shape comfortable in the hand, and the ability to remove wheel material within thousandths of an inch.

Additional features of the invention will be described hereinafter and which will form the subject matter of the claims attached.

Numerous objects, features and advantages of the present invention will be readily apparent to those of ordinary skill in the art upon a reading of the following detailed description of presently preferred, but nonetheless illustrative, embodiments of the present invention when taken in conjunction with the accompanying drawings. In this respect, before explaining the current embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and the scope of the present invention.

It is therefore an object of the present invention to provide a new and improved manual lathe that has all of the advantages of the prior art and none of the disadvantages.

It is another object of the present invention to provide a new and improved manual lathe that may be easily and efficiently manufactured and marketed.

An even further object of the present invention is to provide a new and improved manual lathe that has a low cost of manufacture with regard to both materials and labor, and which accordingly is then susceptible of low prices, thereby making such a manual lathe economically available to the Cub Scouts and their sponsors.

Still another object of the present invention is to provide a manual lathe for rounding and truing wheels of model cars. A round and true wheel precisely positions a spinning wheel that allows a flat fit of the wheel rim to the track, reducing friction, and increasing the speed of the car.

Still yet another object of the present invention is to provide a manual lathe for rounding and truing wheels of model cars. This makes it possible for a Cub Scout or other child to finish a wheel and its rim without a powered tool.

Lastly, it is an object of the present invention is to provide a manual lathe for rounding and truing wheels of model cars. This makes it possible for a Cub Scout or child to finish a wheel with minimal risk of injury and less adult supervision.

These together with other objects of the invention, along with the various features of novelty that characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated the preferred embodiment of the invention.

BRIEF DESCRIPTION OF THE DRAWINGS

The invention will be better understood and objects other than those set forth above will become apparent when consideration is given to the following detailed description thereof. Such description makes reference to the drawings wherein.

The same reference numerals refer to the same parts throughout the various figures.

DESCRIPTION OF THE PREFERRED EMBODIMENT

Figure 1:
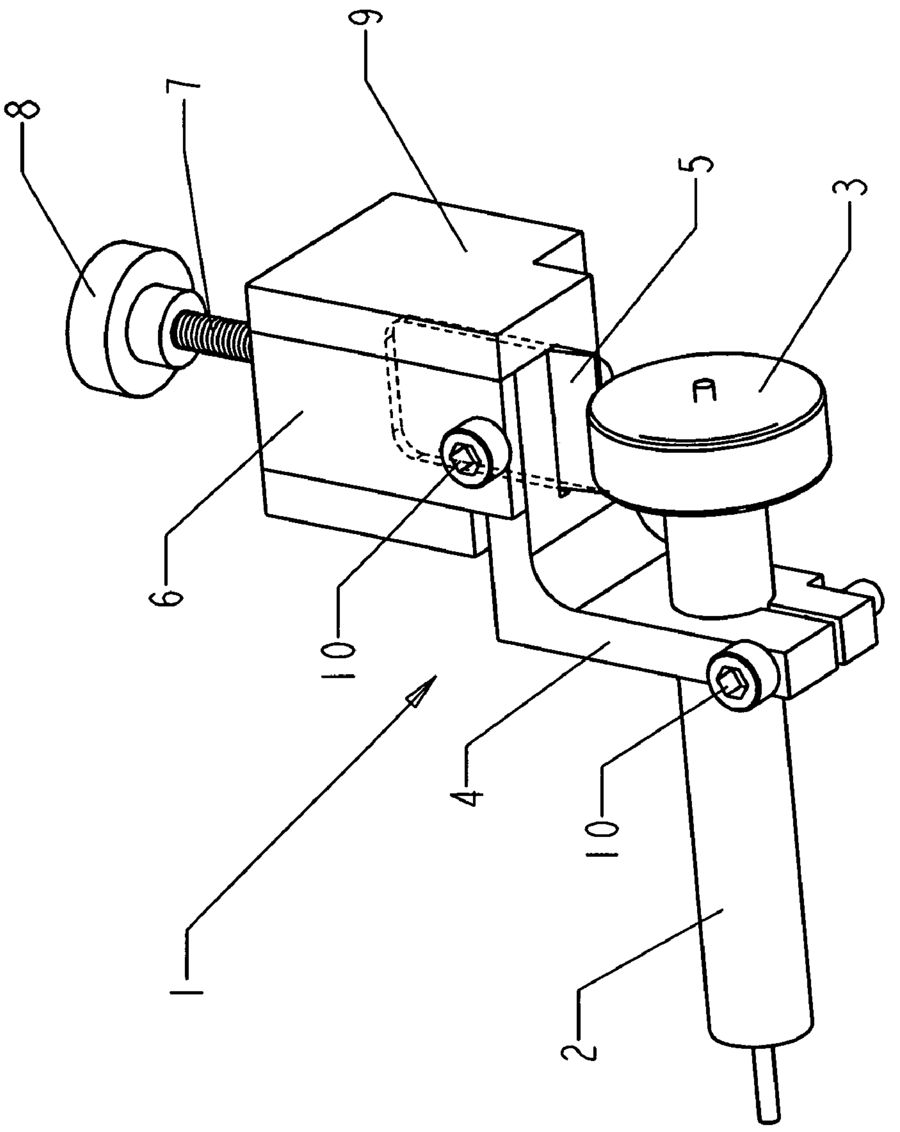
FIG. 1 shows an isometric view of the present invention adapted to be placed upon a spindle or hub tool carrying a wheel.

Referring now to the drawings, and particularly to FIGS. 1-6, a preferred embodiment of the manual lathe of the present invention is shown. The present art overcomes the prior art limitations in rounding a wheel by a Cub Scout or child without power tools and by merely turning a wheel by hand against a secured blade. In FIG. 1, the manual lathe 1 appears in an isometric view with the hub tool 2 placed through the bracket 4. The hub tool positions a wheel 3 to rotate upon an axis centered on the wheel and perpendicular to the plane of rotation of the wheel. The wheel abuts the blade 5 of the present invention and by turning the wheel the blade trues and squares the edge of the wheel, or rim. A wheel with a true and square rim has the rim in full contact with the track and minimizes wobble of the wheel and resulting intermittent contact with the track and guideway.

As each wheel 3 differs, the blade 5 may require adjustment. The blade rests upon the other part of the bracket 4 opposite the hub tool and then connects with the clip 6. The clip contains a threaded rod 7 with a handle 8 and upon turning the handle, the rod advances the blade into and away from the wheel. The handle can be turned by a child under the watchful eye of his sponsor. The clip is secured to the bracket by a bolt 10 and contained within a housing 9. The housing extends away from the bracket for the length of the clip and beyond the width of the clip. The housing contains the clip and threaded rod for protection of the threaded rod and straight alignment of the blade against the edge of the wheel. The housing is further described in FIGS. 6*a-f*.

Before turning the wheel upon the hub tool, the child secures the bracket upon the hub tool by turning a bolt. This bolt 10 is upon the leg of the bracket opposite the blade 5. A bracket secured to the hub tool allows precise trimming of the rim of the wheel as the blade advances with each partial turn of the handle upon the threaded rod.

Figure 2:
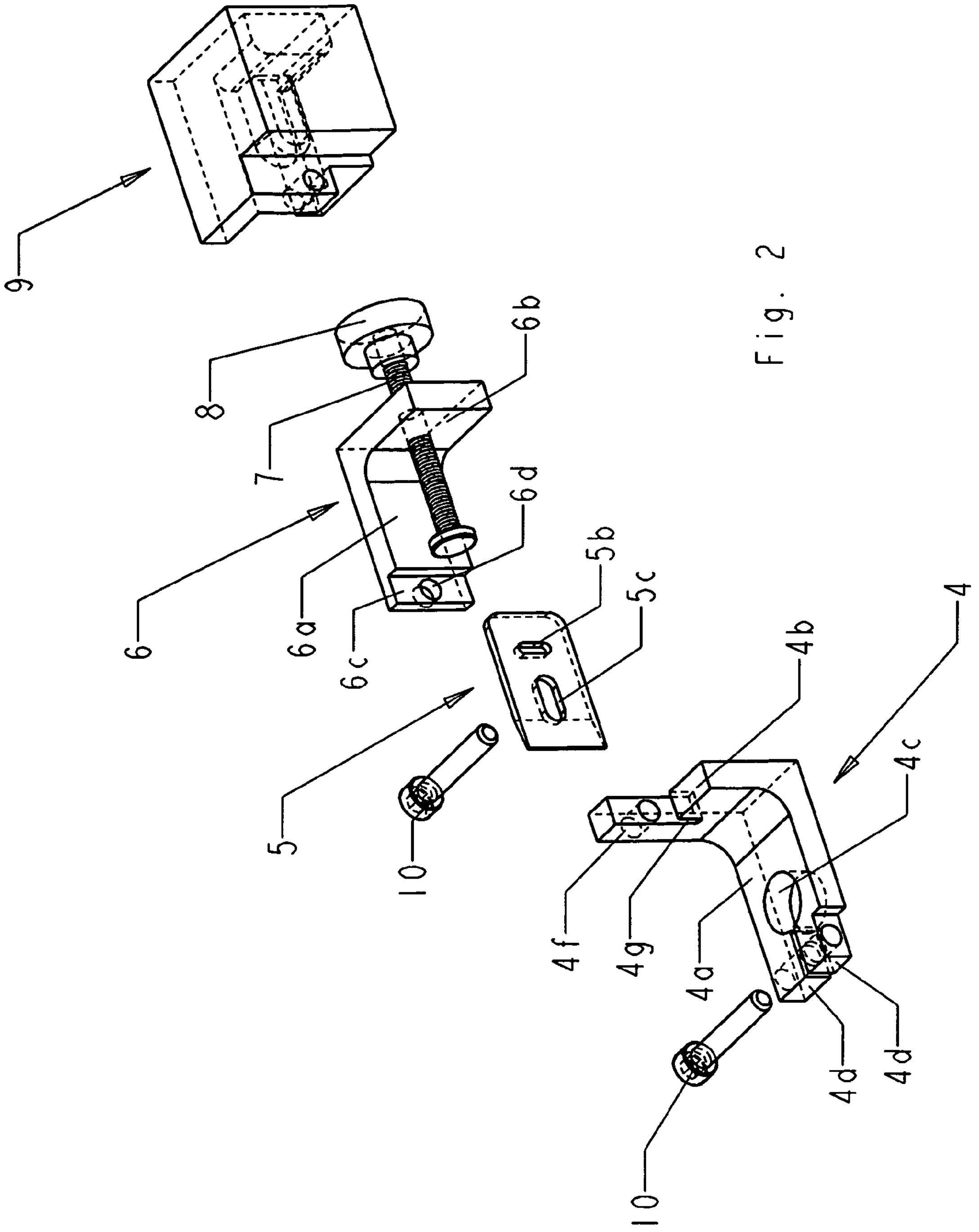
FIG. 2 shows an exploded view of the present invention.

The present invention 1, without a hub tool, appears in an exploded view in FIG. 2. The manual lathe has a bracket 4 generally L shaped with two perpendicular legs, the lower leg 4*a* and the upper leg 4*b* joined upon a common lateral edge. The lower leg, opposite the joint to the upper leg, has a generally centered hole 4*c* that admits the body of the hub tool invented by the applicant. The centered hole 4*c* is incomplete as it has a radial slot extending outwards parallel to the length of the lower leg. The radial slot forms the end of the lower leg, opposite the joint, into two jaws. The jaws 4*d* each have a coaxial hole therethrough that admits a bolt 10 laterally. The bolt has a head upon one end and a threaded connection for a nut upon the other. Upon turning the bolt 10, the jaws 4*d* close and tighten upon a hub tool placed through the hole 4*c* or loosen if the bolt is turned in the opposite direction.

Perpendicular to the lower leg 4*a*, the upper leg 4*b* extends from the joint generally upwards and parallel to the hub tool when installed in the hole 4*c*. The upper leg has an extension 4*f* of greater length than the coplanar shoulder 4*h*. The extension is separated from the shoulder by a slot 4*g*. The blade 5 passes through the slot 4*g*. The extension has a narrower width than the shoulder and has a hole therethrough for a bolt 10 to connect the clip 6, blade 5, and housing 9 as shown in FIG. 1. The shoulder provides a flat rest for the housing as it flanks one surface of the blade.

The blade 5 has a generally flat planar shape and typically rectangular. The blade has a slot 5*a* through which the bolt 10 passes when securing to the extension. Behind the slot 5*a*, the blade has a recess 5*b* that receives the threaded rod.

Behind the blade in FIG. 2, the clip 6 also has a generally L shape with two perpendicular legs, a first leg 6*a*, and a second leg 6*b*. The first leg 6*a* has a generally rectangular shape with a lip 6*c* upon the lateral end that connects to the extension 4*f*. The lip has a hole 6*d* for admitting the bolt 10 as it secures to the extension 4*f*. The first leg 6*a* extends rearward from the lip towards the joint with the perpendicular second leg 6*b*. The second leg has a slightly lesser length than the first leg. Generally centered upon the second leg, a threaded hole 6*e* admits the threaded rod 7. The threaded rod has a pan head 7*a* generally located within the legs of the clip 6. The threaded rod extends through the second leg 6*b* for a length to exit the housing. Opposite the head 7*a*, the threaded rod has the handle 8. The handle is fixed to the threaded rod for turning where the head engages the recess upon the blade thus moving the blade in and out of the second leg and the upper leg.

Behind the clip, the housing 9 has a somewhat U shape with squared corners and edges. Generally the housing is hollow which permits the threaded rod to travel inwards and outwards as it advances the blade when turned. The housing has sufficient rigidity to support the second leg of the clip and to provide a solid connection to the extension while resting upon the shoulder. Each face of the housing 9 is further described in FIGS. 6*a-f*.

Figure 3A:
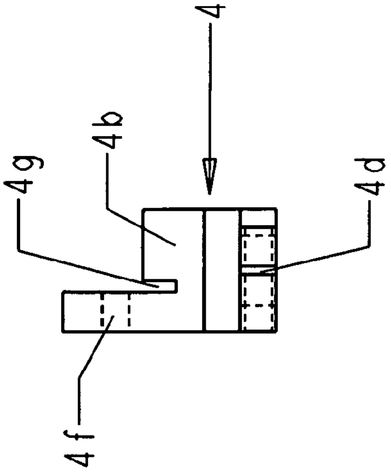
FIG. 3A shows a front view of the bracket of the present invention.

FIG. 3*a* shows a front view of the bracket with the lower leg 4*a* forward and the upper leg 3*b* upward. The lower leg shows the two jaws 4*d* separated by the slot. The upper leg shows the extension 4*f* towards the left and above the shoulder 4*h*. The shoulder is generally wider than half the width of the upper leg. The top of the shoulder is parallel to the top of the extension though located below the top of the extension and below the hole for the bolt 10. The shoulder is spaced apart from the extension thus forming a slot 4*g*. The slot descends vertically below the top of the shoulder and the blade 5 fits into the slot so the top of the blade is flush with the top of the extension.

Figure 3B:
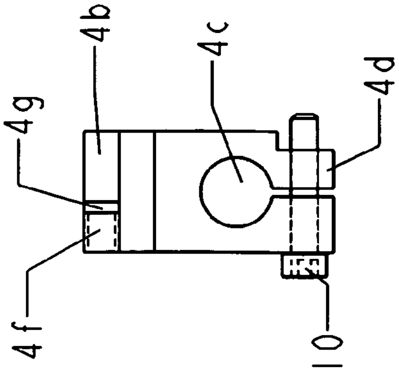
FIG. 3B describes a top view of the bracket.

A top view of the bracket appears in FIG. 3*b*. Here the upper leg 4*b* shows the tops of the extension 4*f* and the shoulder 4*h*. The lower leg 4*a* is shown extending away from the upper leg. The lower leg has a generally centered hole 4*c* that admits a spindle or the handle of the hub tool already patented by the Applicant. In the preferred embodiment, the hole is round and leaves sufficient material on either edge of the lower leg for firm support of the jaws 4*d*. A bolt 10 passes through the jaws and serves as a clamp to secure the bracket at a selected location upon the hub tool.

Figure 3C:
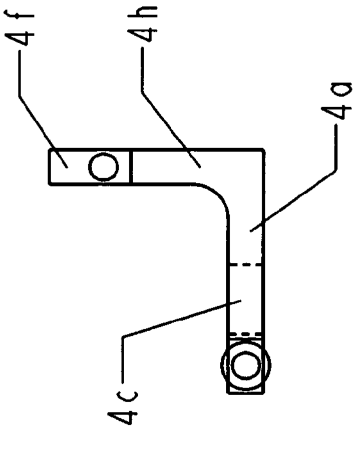
FIG. 3C describes a left side view of the bracket.

FIG. 3*c* shows a left side view of the bracket with the lower leg horizontal. The shoulder 4*h* appears in the foreground as the extension 4*f* rises above it. The extension has a hole to admit a second bolt 10 for guiding the blade and securing the housing to the bracket.

Figure 3D:
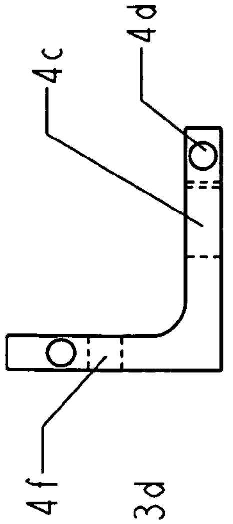
FIG. 3D describes a right side view of the bracket.

The opposite view is shown in FIG. 3*d* where the right side of the bracket has the lower leg horizontal and the extension 4*f* vertical. The extension has a hole for admitting a second bolt. Generally, the extension has less length than the lower leg.

Figure 4A:
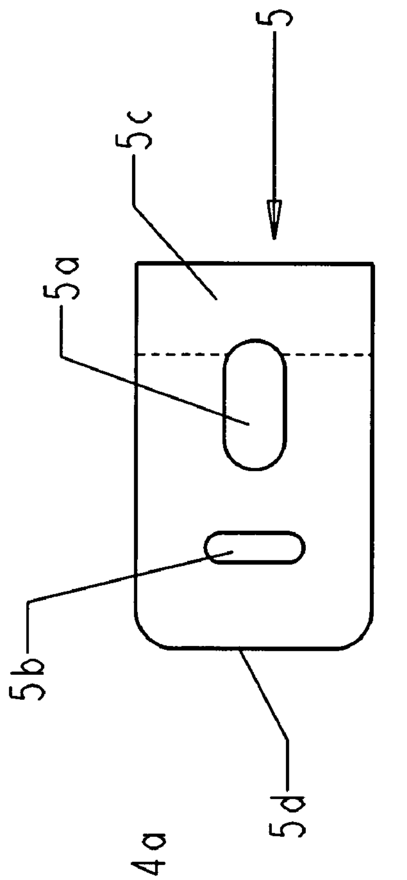
FIG. 4A shows a top view of the blade.
Figure 4B:
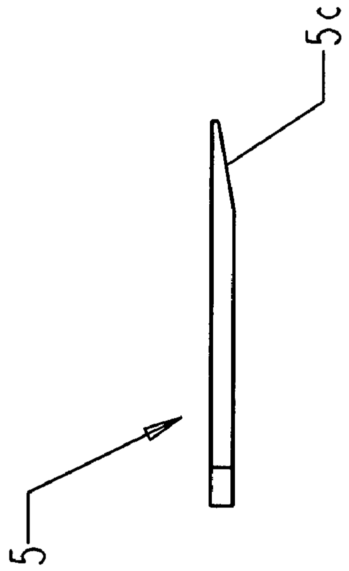
FIG. 4B shows a side view of the blade.

The blade is shown in FIGS. 4*a*, 4*b*. A top view of the blade, FIG. 4*a*, shows a rectangular blade with two parallel spaced apart longitudinal edges and two spaced apart lateral edges. The lateral edges are the front and the opposite rear. The front lateral edge 5*c* is generally tapered across its width. The front lateral edge serves as a gouge when it engages the rim of a wheel. The rear lateral edge 5*d* is the full thickness of the blade and has somewhat rounded corners to ease passage forward and backward within the housing. The blade has a centered slot 5*a* through its thickness that extends for part of its length. The slot permits passage of the second bolt 10 as it secures the housing to the extension. Away from the front lateral edge and outside of the slot, the blade has a recess 5*b* oriented perpendicular to the slot and parallel to the back lateral edge. The recess, as does the slot, extends through the thickness of the blade. The recess has sufficient length to admit the pan head of the threaded rod 7. A longitudinal edge of the blade appears in FIG. 4*b*.

Figure 5A:
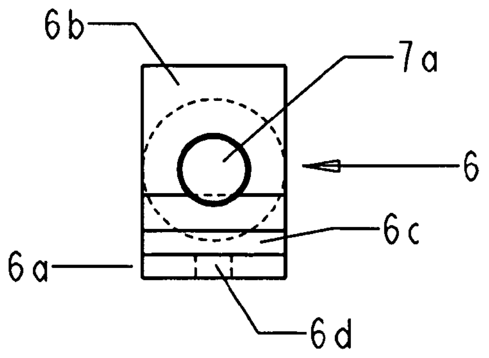
FIG. 5A illustrates a front view of the clip holding the gauge.

FIG. 5*a* shows the clip 6 of the present invention in a front view. The clip supports the threaded rod 7 that engages the blade 5 for truing and squaring the rim of a wheel. In this view, the second leg 6*b* is upright with the pan head 7*a* generally centered in the leg. The first leg 6*a* extends forward from the second leg from a common joint upon a lateral edge. The first leg ends with a lip 6*c* that includes a centered hole 6*d* that admits the second bolt 10 when the clip secures to the extension of the bracket. The lip is of slightly lesser thickness than the first leg. The first leg is generally longer than the second leg of the clip.

Figure 5B:
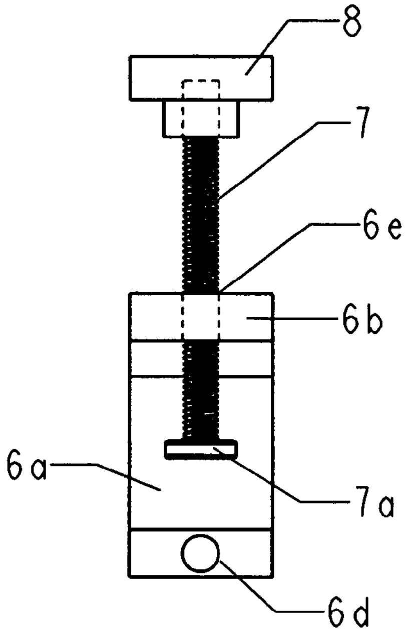
FIG. 5B illustrates a top view of the clip and the gauge.

The clip appears in a top view of FIG. 5*b* where a handle 8 joins to the threaded rod 7 as it advances through a threaded hole in the second leg 6*b*. Inside of the second leg, the threaded rod ends in a pan head 7*a*. The pan head passes over the first leg 6*a* along a centered line of travel. The line of travel passes through the hole 6*d* in the lip.

Figure 5C:
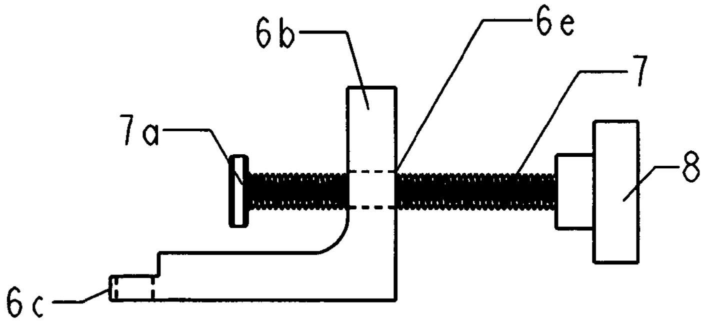
FIG. 5C illustrates a side of the clip and the gauge.

FIG. 5*c* shows the clip from the left side and the right side is a mirror image and not further described. The handle 8 turns the threaded rod 7 through the second leg. The threaded rod is generally centered upon the second leg. The second leg proceeds downward to the common joint with the first leg. The first leg extends away from the second leg, ending in the lip 6*c*. The pan head 7*a* travels on a line along the length of the first leg. The first leg is generally perpendicular to the second leg. When installed upon the bracket, the second leg is spaced away from the upper leg.

The housing appears in the views of FIG. 6 and generally has a hollow rectangular shape. FIG. 6*a* shows a view of the front of the housing 9 where it abuts the extension and the shoulder of the upper leg. A key 9*a* has a generally inverted and rotated L shape with a similar thickness as the extension. The key rests upon the top of the extension, over the slot, and onto the shoulder. The key has a hole to admit the second bolt 10 and a height less than the overall height of the housing. Rotating the housing, FIG. 6*b* shows the top as seen by a user of the invention. The key 9*a* extends forward of the main portion 9*b* of the housing.

Figure 6C:
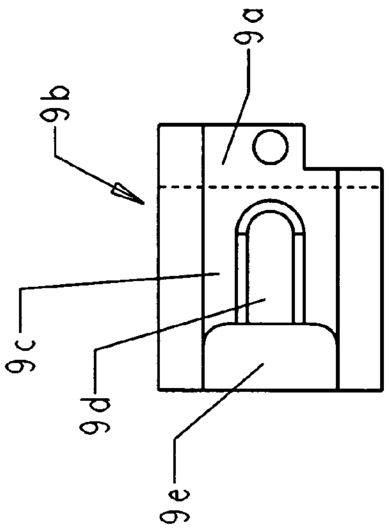
FIG. 6C describes the left side view of the housing where the blade advances.
Figure 6B:
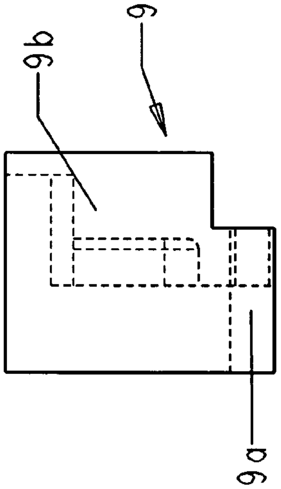
FIG. 6B shows the top view of the housing.
Figure 6A:
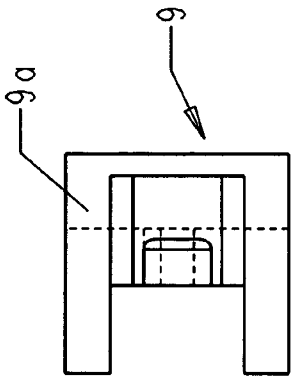
FIG. 6A shows a front view of the housing.

Turning the housing 9 shows the left side view as when the clip 6 is removed in FIG. 6*c*. In this view, the housing is shown as hollow with a first channel 9*c* extending from the rear of the housing to the front at the key 9*a*. The first channel has a depth not fully across the height of the housing. The first channel is sized to admit the blade when installed upright therein. The main portion 9*b* of the housing flanks the first channel upon the top and the bottom. Centered in the first channel, a groove 9*d* extends for the length of the first channel but stops short of the hole in the key 9*a*. The groove has a rounded end near the key. The groove has a depth to accommodate the pan head 7*a* as it travels into and out of the clip. Perpendicular to the first channel, the housing has the second channel 9*e* with rounded corners toward the interior of the housing. The second channel is perpendicular to the first channel and extends partially across the rear of the housing. The second channel has sufficient length to admit the first leg of the clip. The clip is flush to the first channel and the second channel for a smooth appearance of the invention when assembled.

Figure 6F:
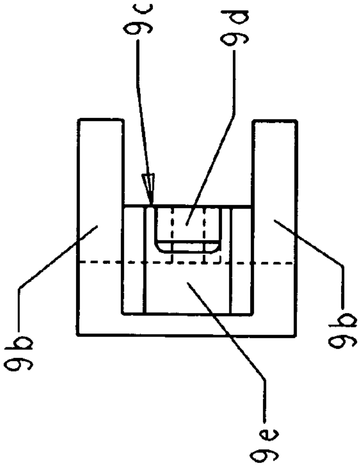
FIG. 6F shows a rear view of the housing.
Figure 6E:
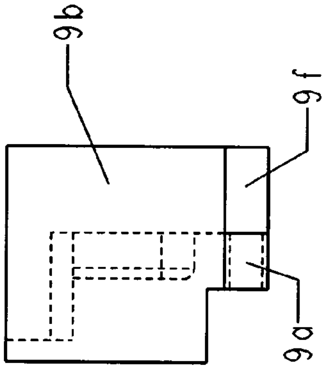
FIG. 6E shows the bottom of the housing.
Figure 6D:
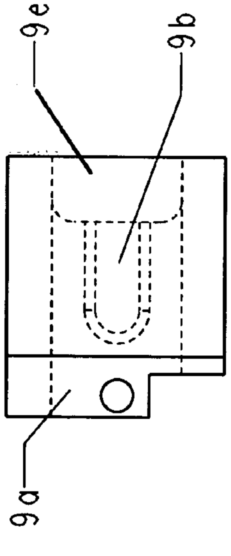
FIG. 6D describes the right side view of the housing.

Turning the housing again, FIG. 6D shows the right side view. The right side begins with the key 9*a* having a shallower height than the main portion 9*b* of the housing. The housing then expands outwards in width where the key abuts the main portion and then extends to the rear. The housing closes off the end of the second channel 9*e*.

Seen from below, a bottom view of the housing appears in FIG. 6*e*. The bottom begins with the key 9*a*. The key extends slightly forward of the main portion 9*b* of the housing. The forward portion is denoted 9*f* and appears as an inset that allows the housing to rest upon the shoulder when installed.

And seen from the rear, the housing is shown again with the clip removed in FIG. 6*f*. In this view, the second channel 9*e* appears flanked on the top and the bottom by the main portion 9*b* of the housing. Centered and inward from the second channel, the groove 9*d* extends forward to the key. The groove remains within the first channel 9*c* here shown on edge. The groove guides the pan head forwards and backwards as a user adjusts the blade to true and square the rim of a wheel.

Typically, the manual lathe operates in many environments such as a basement workshop, a garage, trackside, and the like. To utilize the present art, a child, under the watchful eye of a sponsor, places the recess of the blade upon the pan head with the first leg towards the child. The child then places the blade 5 within the first channel 9*c* and the pan head 7*a* within the groove 9*d*. The handle 8 extends away from the rear of the housing. The child then places the front edge of the blade 5*c* into the slot 4*g* and the key 9*a* of the housing within the extension 4*f*. The first leg 6*a* is placed upon the outside of the extension and the first bolt 10 is secured through the clip, the extension, the blade slot, and then the key 9*a*.

Next, the child loosens the first bolt upon the lower leg of the bracket. This opens the jaws for the child to insert the hub tool, or other spindle. The hub tool is inserted through the hole 4*c* so the tip of the hub tool or spindle extends beyond the lower leg and the handle secures between the jaws. With the tip approximately centered on the upper leg, the child secures the first bolt thus clamping the invention upon the hub tool. The child then places a wheel upon the tip so that it rotates upon the tip with the rim contacting the blade. To true and square the rim of a wheel, the child then turns the handle to advance the blade into the rim. The child then gently rotates the wheel and removes thin layers of material from the rim. The child may turn the handle and advance the blade in steps to remove additional material from the rim. The child and sponsor must be mindful to leave sufficient material upon the rim to prevent deflection of the rim under the weight of a car body. In using this tool, the child removes weight from the wheels and improves their alignment to save the hundredths of a second needed for victory in a Pinewood Derby race.

While a preferred embodiment of the manual lathe has been described in detail, it should be apparent that modifications and variations thereto are possible, all of which fall within the true spirit and scope of the invention. The manual lathe and its various components may be manufactured from many materials including, but not limited to, ferrous and non-ferrous metals and their alloys, plastics, and composites. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention. From the aforementioned description, a manual lathe has been described. The manual lathe is uniquely capable of rounding and truing model car wheels by hand and with a minimal risk of injury.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A hand powered lathe to true and square a wheel for a model car adapted to be secured upon a hub tool or other spindle, comprising:

a bracket, generally L shaped with a lower leg adapted to receive the hub tool and an upper leg generally perpendicular to said lower leg;

a blade, slidably connected to said upper leg;

a clip, generally L shaped, connecting to said upper leg and having a threaded rod with a handle thereon, said threaded rod engaging said blade; and, a housing, generally hollow and rectangular, said housing including a key for connecting to said upper leg, and at least one channel for passage of said threaded rod and said blade;

whereby turning said handle advances said rod and then said blade inside of said upper leg against the rim of the wheel.

2. The hand powered lathe of claim 1 further comprising:

said lower leg having a generally rectangular shape, a generally centered hole, two opposed jaws ahead of said hole opposite said upper leg and separated by a slot, a bolt passing through both of said jaws for closing same; and, said upper leg having an extension partially across the width of said upper leg, a shoulder spaced apart from said extension and below said extension in height and substantially the width of said blade, and a slot separating said extension from said shoulder having a width to admit said blade when on edge.

3. The hand powered lathe of claim 1 further comprising:

said blade, having a generally rectangular shape, a forward lateral edge and an opposite rearward lateral edge, a centered slot extending partially longitudinally for admitting the connection of said housing to said upper leg, and a recess behind said slot through said blade and ahead of said rearward lateral edge for receiving said threaded rod.

4. The hand powered lathe of claim 2 further comprising:

said blade having a centered longitudinal slot and a recess behind said slot through said blade;

said clip having a first leg and a second leg perpendicular to said first leg, a hole in said second leg for admitting said threaded rod;

said first leg having a lip opposite said second leg, said lip connecting to said extension;

said threaded rod turning through said hole in said second leg and having a head opposite said handle, said head engaging said recess.

5. The hand powered lathe of claim 4 wherein said head is a round pan head.

6. The hand powered lathe of claim 2 further comprising: said housing having a main portion rearward of said key, a first channel, generally centered in said housing and extending for the length of said housing, said blade traveling in said first channel, a groove centered within said first channel, said threaded rod traveling in said groove, and a second channel, generally centered in said housing opposite said key, said handle abutting said second channel.

7. A hand powered lathe to true and square a wheel for a model car adapted to be secured upon a spindle, such as a hub tool, comprising:

a bracket, generally L shaped with a lower leg adapted to receive the hub tool and an upper leg generally perpendicular to said lower leg;

a rectangular blade, slidably connected to said upper leg said blade having a centered partially lengthwise slot and a recess perpendicular to said slot;

a clip, generally L shaped, connecting to said upper leg and having a threaded rod with a handle and an opposite head, the edge of said head engaging said recess; and, a housing, generally hollow and rectangular, said housing including a key for connecting to said upper leg, a main portion behind said key, a first channel for passage of said threaded rod and said blade, and a second channel perpendicular to said first channel for admitting said handle;

said handle turning said rod and thus said head upon said blade, advancing said blade against a rim of the wheel.

8. A hand powered lathe to true and square a wheel for a model car adapted to be secured upon a spindle, such as a hub tool, comprising:

a bracket assembly, having a lower leg adapted to receive the hub tool, an upper leg generally perpendicular to said lower leg and forming a generally L shape, a first leg extending from said upper leg and a second leg extending from said first leg generally spaced apart from said upper leg;

a rectangular blade, slidably connected to said upper leg said blade having a centered partially lengthwise slot and a recess perpendicular to said slot;

a threaded rod through said second leg and having a handle and an opposite head, said head having a perimeter edge for engaging said recess; and, a housing, generally hollow and rectangular, said housing including a key for connecting to said upper leg, a main portion behind said key, a first channel for passage of said threaded rod and said blade, and a second channel perpendicular to said first channel for admitting said handle;

said handle turning said rod and then said head upon said blade, thus advancing said blade against a rim of the wheel.

* * * * *